United States Patent
Elbanhawy

(10) Patent No.: US 7,449,868 B2
(45) Date of Patent: Nov. 11, 2008

(54) CURRENT CONTROLLED GATE DRIVER FOR POWER SWITCHES

(75) Inventor: Alaa Elbanhawy, Hollister, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 171 days.

(21) Appl. No.: 11/006,345

(22) Filed: Dec. 7, 2004

(65) Prior Publication Data

US 2006/0119332 A1    Jun. 8, 2006

(51) Int. Cl.
   G05F 1/40    (2006.01)
   G05F 1/56    (2006.01)

(52) U.S. Cl. ........................... 323/271; 323/282

(58) Field of Classification Search .......... 323/268, 323/270, 271, 273, 275–277, 282, 285; 363/97, 363/98, 131, 132
See application file for complete search history.

(56) References Cited

U.S. PATENT DOCUMENTS

| | | | | |
|---|---|---|---|---|
| 4,378,530 A | | 3/1983 | Garde et al. | |
| 5,414,341 A | * | 5/1995 | Brown | 323/268 |
| 5,936,387 A | * | 8/1999 | Tabata et al. | 323/225 |
| 5,943,227 A | | 8/1999 | Bryson et al. | |
| 6,798,157 B2 | * | 9/2004 | Takahashi et al. | 318/254 |
| 6,936,995 B2 | * | 8/2005 | Kapsokavathis et al. | 320/132 |
| 7,141,955 B1 | * | 11/2006 | Martinez | 323/272 |
| 7,151,406 B2 | * | 12/2006 | Labbe | 330/251 |
| 2005/0017767 A1 | | 1/2005 | Huang et al. | |

OTHER PUBLICATIONS

PCT International Search Report for PCT Application No. PCT/2005/044209.
"Operation and Application of the Sentron CSA-1V-SO Surface Mount Current Sensor," Aug. 17, 2004, XP002379804, pp. 1-14.

* cited by examiner

*Primary Examiner*—Matthew V Nguyen
(74) *Attorney, Agent, or Firm*—Sidley Austin LLP

(57) ABSTRACT

A current sensor circuit is provided for sensing a current of a power converter and generating a voltage proportional to the sensed current. The generated voltage proportional to the sensed current is used to drive at least one switch in the power converter.

7 Claims, 8 Drawing Sheets

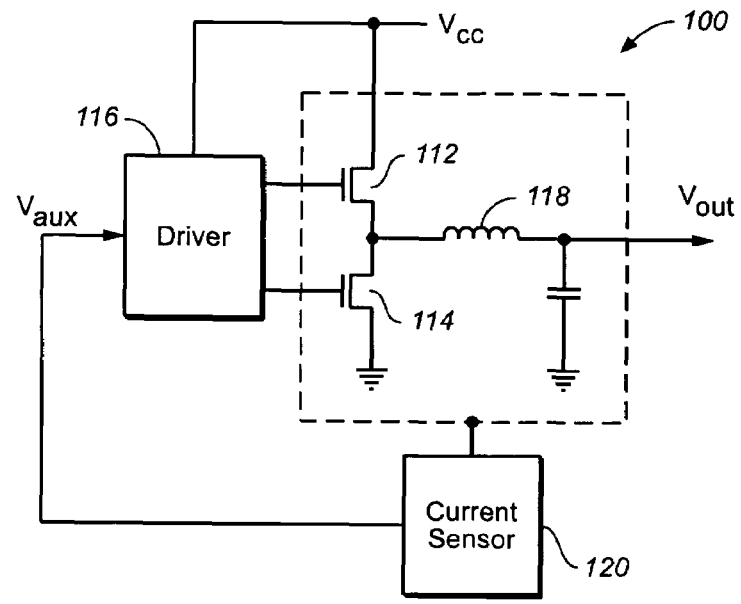
FIG._1
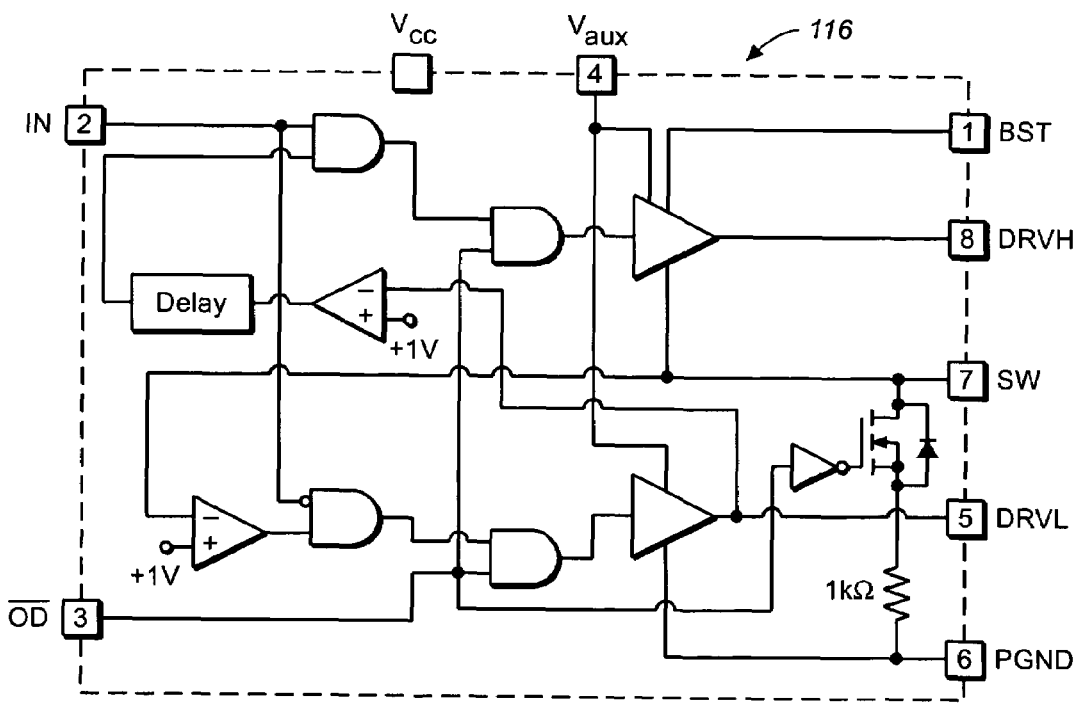
FIG._2A

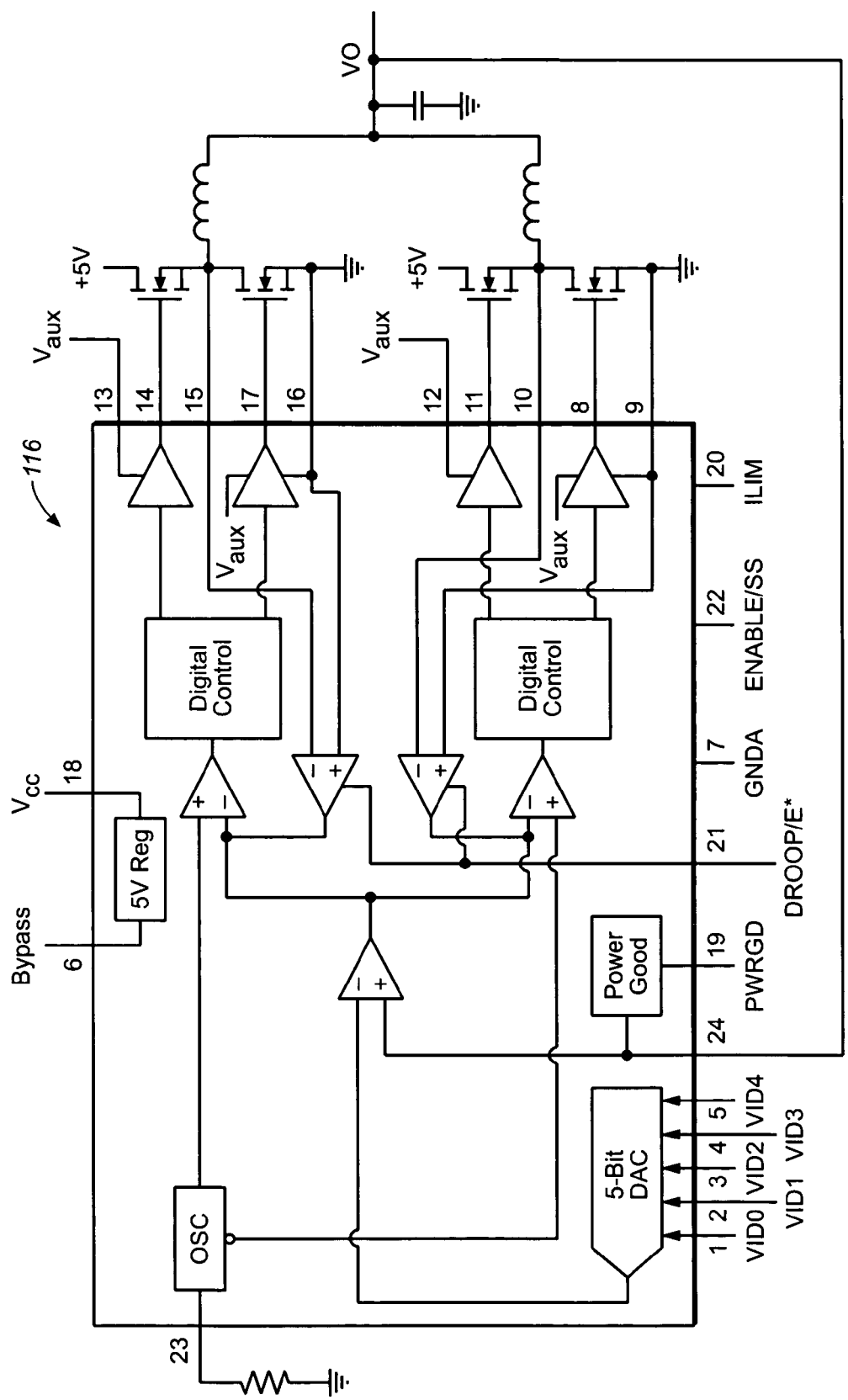
FIG._2B

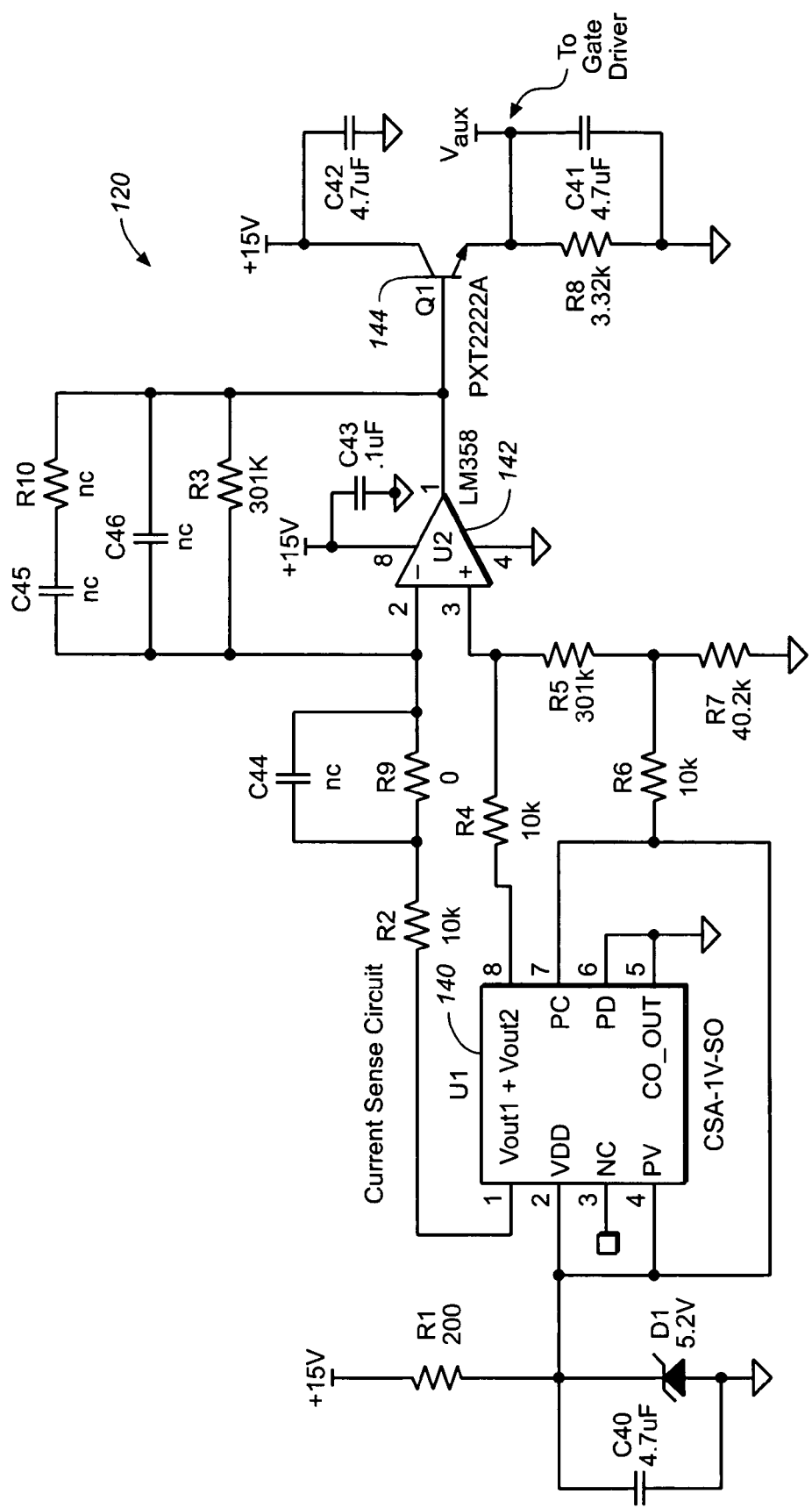
FIG._3

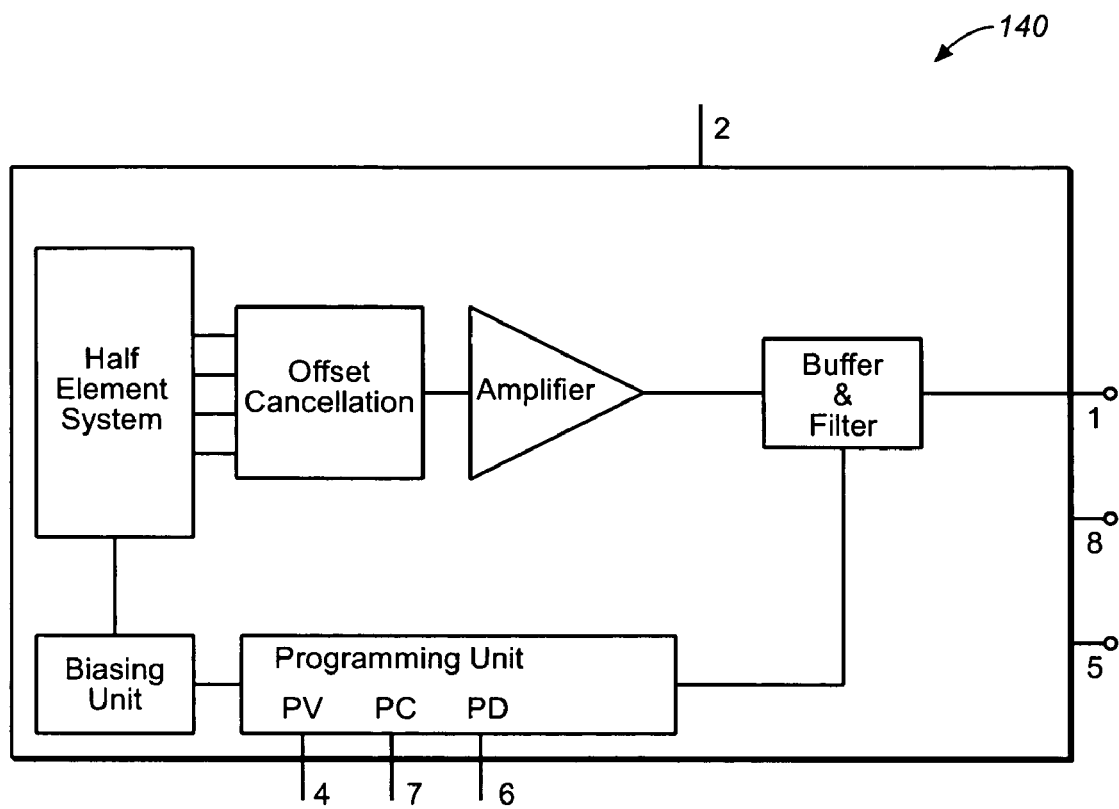
FIG._4

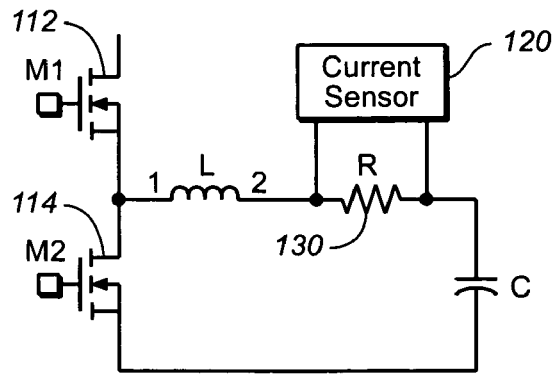
FIG._5A
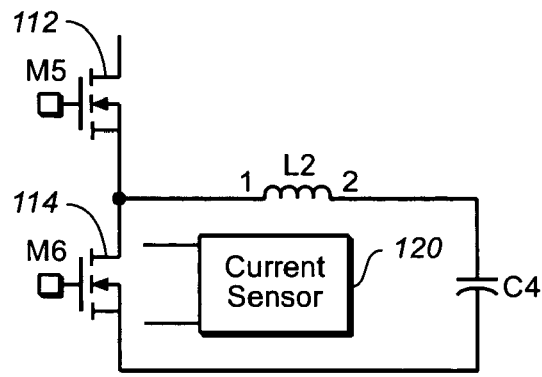
FIG._5B
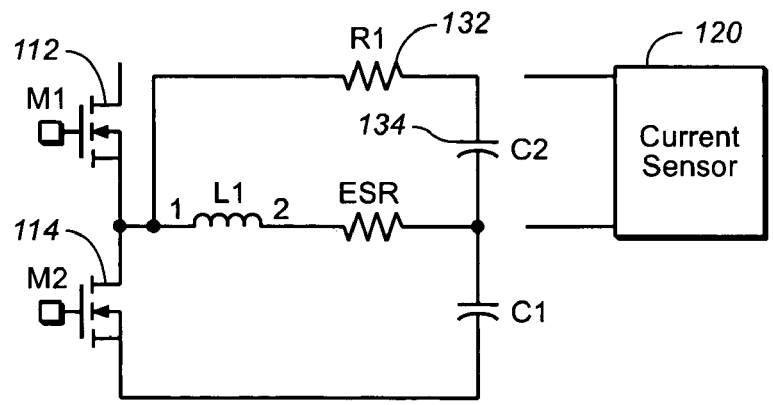
FIG._5C

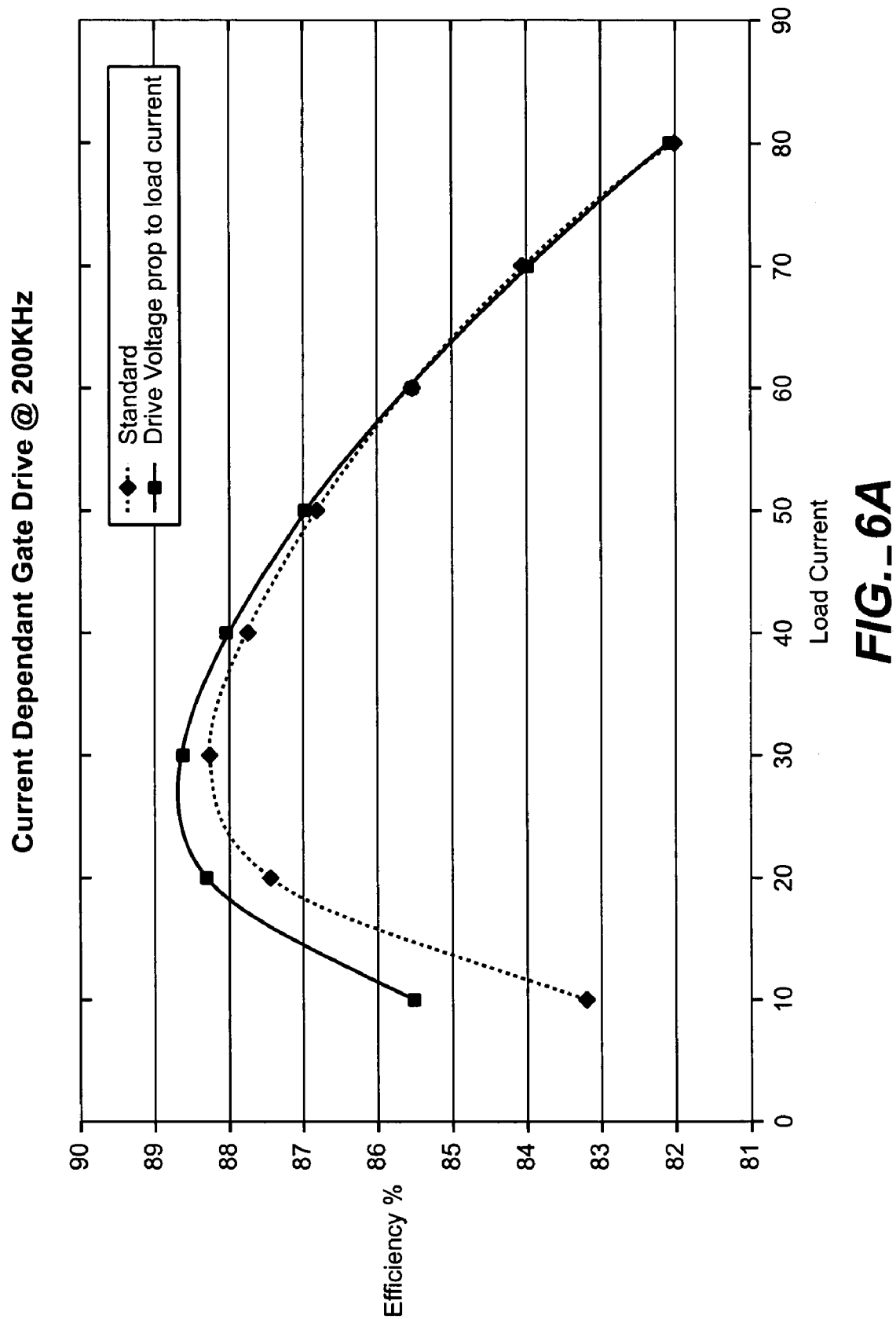
FIG._6A

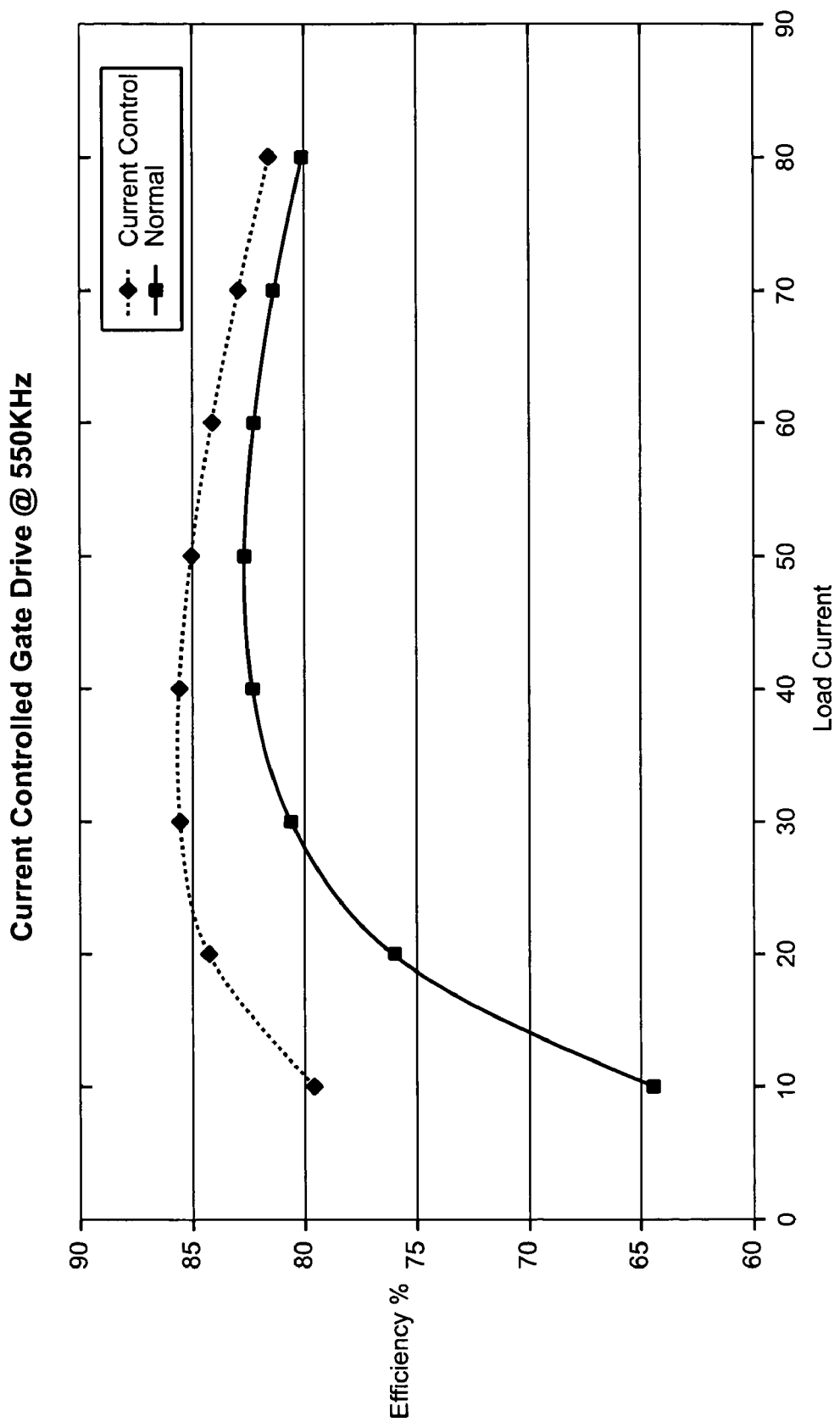
FIG._6B

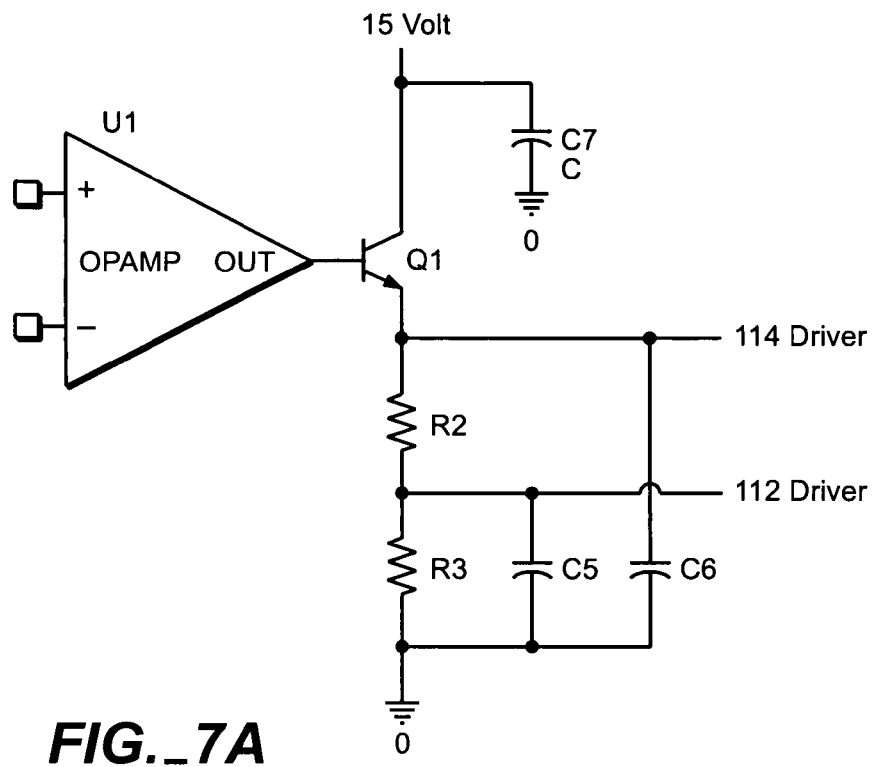
FIG._7A
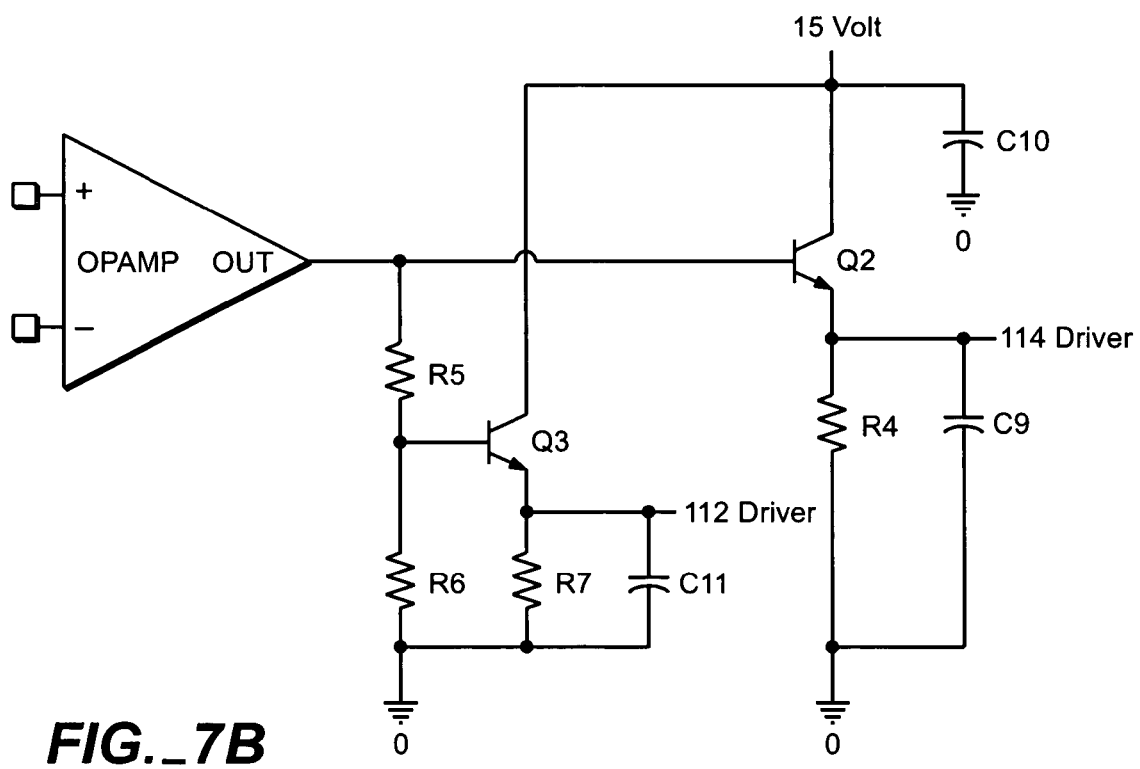
FIG._7B

US 7,449,868 B2

CURRENT CONTROLLED GATE DRIVER FOR POWER SWITCHES

TECHNICAL FIELD OF THE INVENTION

This invention relates to power conversion, and more particularly, to a current controlled gate driver for power switches.

BACKGROUND

Power converters are used to convert power from one form or magnitude into another. Various types of power converters include a buck (step-down) converter, a boost (step-up) converter, and a buck-boost converter. Many power converters employ one or more switches, such as metal-oxide-semiconductor field effect transistors (MOSFETs), having gates to which driving voltages are applied. The efficiency of some power converters (e.g., a synchronous buck converter) is related to conduction and dynamic loss mechanisms. Both of these loss mechanisms depend on the gate driver voltage at a specific current and switching frequency. According to previously developed techniques, the optimum voltage at the maximum current in the power converter was determined and used as the default gate driver voltage for all currents. A buck converter implemented in this way will be optimally efficient only when maximum current is flowing. At all other current levels, the buck converter will be operating at less than optimal efficiency.

SUMMARY

According to an embodiment of the present invention, a current sensor circuit is provided for sensing a current of a power converter and generating a voltage proportional to the sensed current. The generated voltage proportional to the sensed current is used to drive at least one switch in the power converter.

According to another embodiment of the present invention, a method is provided for driving a power converter. The method includes sensing a current flowing in the power converter; generating a voltage proportional to the sensed current; and driving at least one switch in the power converter using the generated voltage proportional to the sensed current.

According to yet another embodiment of the present invention, a power converter includes a first switch and a second switch in a half-bridge arrangement. A driver circuit is connected to a gate of the first switch and a gate of the second switch. A current sensor, which is connected to the driver circuit, is operable to sense a current flowing in the power converter, to generate a voltage proportional to the sensed current, and to provide the generated voltage to the driver circuit. The driver circuit is operable to drive the gates of the first and second switches using the generated voltage.

In one embodiment, a synchronous buck converter is provided with a current sense integrated circuit (IC) device. The IC device is placed over a current-carrying trace of a printed circuit board (PCB) at the O/P of the converter. This IC device generates a voltage that is proportional to the current passing in the trace underneath. The voltage from the IC device is introduced to an operational amplifier to obtain a desired voltage range. The output of the operational amplifier is applied to an NPN transistor to supply the voltage for the driver requirements at appropriate current levels. Voltage corresponding to the current is then used by the gate driver which controls the amplitude of the voltage at which switching transistors (e.g., MOSFETs) of the converter are driven. In this way, at low currents, the switching transistors are driven with varying voltage level (e.g., going up to 8-12V) depending on current, the switches, and switching frequency.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIG. 1 is a schematic diagram in partial block form of one implementation for a power converter with current controlled gate driver, according to an embodiment of the present invention.

FIGS. 2A and 2B are schematic diagrams in partial block form of exemplary implementations for a driver, according to an embodiment of the present invention.

FIG. 3 is a schematic diagram in partial block form of an exemplary implementation for a current sensor, according to an embodiment of the present invention.

FIG. 4 is a schematic diagram in partial block form of an exemplary implementation for an integrated circuit for current sensing.

FIGS. 5A-5C are a schematic diagrams of various techniques for a current sensing, according to an embodiment of the present invention.

FIGS. 6A and 6B are charts comparing the efficiency at various frequency levels of a power converter according to embodiments of the present invention with the efficiency of a power converter according to previously developed techniques.

FIGS. 7A and 7B are schematic diagrams in partial block form of exemplary implementations for driver circuitry, according to an embodiment of the present invention.

DETAILED DESCRIPTION

The embodiments of the present invention and their advantages are best understood by referring to FIGS. 1 through 7B of the drawings. Like numerals are used for like and corresponding parts of the various drawings.

In power converters using switches, such as metal-oxide-semiconductor field effect transistors (MOSFETs), the gate drive voltage of the switches has a significant effect on overall efficiency. At higher current levels, larger gate drive voltage will result in higher efficiency. Embodiments of the present invention optimize or vary the gate drive voltage in a power converter, depending on current, to maximize or increase efficiency in a power converter. This allows the gate drive voltage to be optimized at all current conditions. This optimization may be particularly evident at higher switching frequencies (e.g., 550 KHz).

FIG. 1 is a schematic diagram in partial block form of a power converter 100 with current controlled gate driver, according to an embodiment of the present invention. Power converter 100 can be a buck (step-down) converter which converts a direct current (DC) voltage at one magnitude into a DC voltage at a lower magnitude. As shown, power converter 100 includes switches 112 and 114, a driver 116, an inductance-capacitance (LC) network 118, and a current sensor 120. In one embodiment, these components can be assembled on a printed circuit board (PCB) having various traces for conveying signals therebetween.

Each switch 112, 114 can be implemented as, for example, a metal-oxide-semiconductor field effect transistor (MOSFET), an IGBT, a MOS-gated thyristor, or other suitable power device. As depicted, in one embodiment, switches 112 and 114 are connected in a half-bridge or "totem pole" arrangement. In this arrangement, switch 114 may be considered or referred to as the "low-side switch," and switch 112 may be considered or referred to as the "high-side switch." In other embodiments, more or fewer switches may be used and connected in other arrangements, such as, for example, four switches connected in a full-bridge arrangement. Each switch 112, 114 has a gate to which driving voltage may be applied. The switches 112 and 114 can be driven to alternatingly conduct. That is, switches 112 and 114 are not turned on simultaneously. Rather, when switch 112 is turned on and conducting, switch 114 is turned off; and when switch 114 is turned on and conducting, switch 112 is turned off.

Driver 116 is connected to the gates of switches 112 and 114, and generally functions to provide driving voltages thereto. According to embodiments of the present invention, the voltage used to drive switches 112 and 114 is proportional to the value of the output current for the power converter 100. In some embodiments, driver 116 can be implemented as one or more integrated circuit (IC) devices. Exemplary implementations for driver 116 are depicted in FIGS. 2A and 2B.

Referring to FIG. 2A, driver 116 may be connected to a controller (not shown) for receiving control signals at input terminals (IN and OD). Such controller may include a pulse width modulator (PWM) and other control circuitry. The voltages for driving the gates of switches 112 and 114 of power converter 100 are output at DRVH and DRVL (i.e., pins 8 and 5), respectively. The exemplary implementation of driver 116 depicted in FIG. 2A can be a variation of IC device FAN53418 available from Fairchild Semiconductor Corporation.

Now turning to FIG. 2B, another exemplary implementation of driver 116 is capable of driving multiple high-side and multiple low-side switches. As shown, the voltages for driving the gates of the switches are output at pins 14, 17, 11, and 8. The exemplary implementation of driver 116 depicted in FIG. 2B can be a variation of IC device FAN5091 available from Fairchild Semiconductor Corporation.

In some embodiments, the voltage that is used to drive switch 112 can be different from the voltage used to drive switch 114. FIGS. 7A and 7B show exemplary implementations for driver circuitry that drive switches 112 and 114 using different voltage levels. With this approach, the performance of each of switches 112 and 114 can be optimized separately.

Referring again to FIG. 1, LC network 118 includes inductive and capacitive elements. LC network 118 represents the output filter for the power converter.

Current sensor 120 generally functions to sense a current in the power converter 100 and to generate a voltage that is proportional to the sensed current. The current which is sensed can be the load current for power converter 100 or some other current, such as the current flowing through one of the switches 112 or 114 or the current flowing through a discrete component (e.g., resistor or inductor) or series of components.

Current sensor 120 can be implemented in various ways. For example, in one embodiment, current sensor 120 may comprise a Hall effect sense circuit or similar circuit. The Hall effect sense circuit can be implemented in part with an IC device which straddles the PCB trace on the which the load current appears, as depicted in FIG. 1. The Hall effect sense circuit can be followed by an operational amplifier and a suitable power stage to supply the drive voltage to the gate driver 116 at a current of up to, for example, a few tens of milliamps. One implementation for such current sensor 120 using a Hall effect sense circuit is described in more detail below with reference to FIGS. 3 and 4. In other embodiments, for example, as shown in FIGS. 5A-5C, current sensor 120 can be implemented with other sensing circuitry which may be, for example, incorporated into the one or more IC devices for the driver 116. This circuitry may function to sense current in the power converter 100 by measuring a voltage across a sense resistor in series with the LC network 118, measuring the voltage drop across the switch 112 or 114, or by measuring the voltage across an equivalent series resistance (ESR).

Current sensor 120 provides a voltage that is proportional to the current which is sensed. This voltage is distinct from the general Vcc voltage, and as such, can be considered an auxiliary voltage (Vaux). See, for example, FIGS. 2A and 2B. The Vaux generated by current sensor 120 is supplied to driver 116 for use in driving the gates of switches 112 and 114. In one embodiment, high side switch 112 and the low side switch 114 are driven with the same voltage Vaux. In an alternative embodiment, the switches are driven with different voltages.

The magnitude of Vaux (for driving the gates of switches 112 and 114) varies with the sensed current. For example, in one embodiment, at zero load current (load current=0), the magnitude of Vaux can be selected (determined experimentally) to be a suitable non-zero voltage Vmin, such as, for example, 4-5V, to maximize efficiency under such condition. At full load current, the magnitude of Vaux from current sensor 120 can be selected (experimentally determined) to be a suitable voltage Vmax, for example, 8-12V, to yield the highest efficiency under this condition. For all other operating conditions (i.e., between zero load current and full load current), the gate driving voltage will range between Vmin to Vmax. This range of voltages may be linear or nonlinear.

Thus, at low currents, the switches 112 and 114 in power converter 100 are driven with a low voltage magnitude for Vaux, and as current increases, the magnitude of the driving voltage Vaux also increases depending on the MOSFET and then switching frequency. This technique can improve the efficiency of the power converter 100 over a conventional fixed-voltage approach.

With previously developed techniques, the gate driver voltage is fixed at particular voltage level, typically 5V or 12V. Such voltage level is generally derived by determining the optimum gate drive voltage at full load. As such, these techniques give the optimum voltage only at one point of operation. The fixed driving voltage level is not optimal for all points of operation, and accordingly the efficiency of the power converter suffers.

Power converters using the techniques of the present invention can achieve (at a very low cost) up to 15% improvement in efficiency over converters using previously developed techniques. This is particularly important in such applications as notebook computers where the slightest increase in efficiency helps the overall performance by, for example, reducing the operating temperature and requiring lower cost cooling systems and longer battery life.

FIG. 3 is a schematic diagram in partial block form of an exemplary implementation for a current sensor 120, according to an embodiment of the present invention. Such implementation for current sensor 120 may include an integrated circuit (IC) device 140, an operational amplifier 142, and a transistor 144.

In one embodiment, the IC device 140 can be implemented with, for example, a Sentron CSA-1V-SO available from GMW Associates. IC device 140 may be placed on a trace through which load current passes. FIG. 4 is a schematic diagram in partial block form of an exemplary implementation for the IC device 140 shown in FIG. 3. IC device 140 may implement a Hall Effect circuit which generates a voltage that is proportional to the current passing in the trace underneath it.

The voltage output from IC device 140 is introduced to the operational amplifier 142 to obtain the desired voltage range. The output of the operational amplifier 142 is applied to the base of transistor 144, which can be implemented as an NPN transistor. Transistor 144 supplies current enough for the driver requirements. The voltage at the emitter of transistor 144 is then used as the Vaux voltage for the driver 116 which controls the amplitude of the gate drive voltage (see FIG. 1).

Although the embodiment for current sensor 120 shown in FIGS. 3 and 4 uses Hall effect sensing, other techniques can be used in accordance with the present invention. A number of these various alternative techniques for current sensing are depicted in FIGS. 5A-5C.

Referring to FIG. 5A, in one such technique, current may be sensed by measuring a voltage across a sense resistor 130 in series with the LC network 118. In this embodiment, current sensor 120 may be implemented as circuitry incorporated into one or more IC devices (such as, for example, the same or different IC devices for the driver 116), or alternatively, as discrete components.

Referring to FIG. 5B, in another technique, current may be sensed by measuring a voltage across either the high-side switch 112 or low-side switch 114. As depicted, the voltage across the low-side switch 114 is measured. Low-side switch 114 may function as a synchronous rectifier. In this embodiment, current sensor 120 may be implemented as circuitry incorporated into the same one or more IC devices as for the driver 116. With this embodiment, measuring the voltage across the synchronous rectifier to determine the load current adds little to no extra cost to the implementation for the driver 116.

With reference to FIG. 5C, in yet another technique, a resistor 32 and capacitor 34 are provided in parallel with the inductance of the LC network 118. Resistor 132 and capacitor 134 filter out the ripples across the inductor. The DC voltage is measured across the inductor equivalent series resistance (ESR). In this embodiment, current sensor 120 may be implemented as circuitry incorporated into one or more IC devices (such as, for example, the same or different IC devices for the driver 116), or alternatively, as discrete components.

FIGS. 6A and 6B are charts comparing the efficiency at various frequency levels of a power converter according to embodiments of the present invention with the efficiency of a power converter according to previously developed techniques. FIG. 6A shows the improvement in efficiency at 200 KHz and FIG. 6B shows the efficiency improvement at 500 KHz. The benefit can be more evident at high switching frequency due to the higher dynamic losses that may be controlled by controlling the gate drive voltage. In particular, referring to FIG. 6B, this improvement in efficiency can be up to 16% at low currents (e.g., 10 Amps) and 1.5% at high current (e.g., 80 Amps).

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

The invention claimed is:

1. A power converter comprising:
a first switch and a second switch in a half-bridge arrangement;
a driver circuit connected to a gate of the first switch and a gate of the second switch;
a current sensor connected to the driver circuit, the current sensor operable to sense a current flowing in the power converter, to generate a voltage proportional to the sensed current, and to provide the generated voltage to the driver circuit; and
wherein the driver circuit is operable to drive the gates of the first and second switches using the generated voltage;
wherein the current sensor comprises:
a Hall effect sense circuit;
an operational amplifier connected the Hall effect sense circuit; and
a transistor connected to an output of the operational amplifier.

2. The power converter of claim 1 comprising an L-C circuit connected to the first and second switches.

3. The power converter of claim 1 wherein the driver circuit and the current sensor are implemented on the same integrated circuit device.

4. The power converter of claim 1 wherein at least one of the first switch and the second switch is implemented as a MOSFET.

5. The power converter of claim 1 wherein at least one of the first switch and the second switch is implemented as an IGBT.

6. The power converter of claim 1 wherein at least one of the first switch and the second switch is implemented as a MOS-gated thryristor.

7. The power converter of claim 1 wherein the driver circuit drives the first switch with a first driving voltage and the second switch with a second driving voltage, wherein the first driving voltage and the second driving voltage do not have the same magnitude.

* * * * *